US012441204B2

United States Patent
Saisho et al.

(10) Patent No.: US 12,441,204 B2
(45) Date of Patent: Oct. 14, 2025

(54) CHARGE-AND-DISCHARGE MANAGEMENT SYSTEM

(71) Applicant: Prime Planet Energy & Solutions, Inc., Tokyo (JP)

(72) Inventors: Miho Saisho, Kobe (JP); Kiyota Taniguchi, Hyogo-ken (JP); Aya Sato, Nagoya (JP); Yuki Ito, Kasugai (JP); Katsushi Saito, Nagakute (JP); Masato Koutari, Kakogawa (JP); Hiroshi Tatsumi, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 682 days.

(21) Appl. No.: 17/858,076

(22) Filed: Jul. 6, 2022

(65) Prior Publication Data

US 2023/0008938 A1  Jan. 12, 2023

(30) Foreign Application Priority Data

Jul. 7, 2021  (JP) .................................. 2021-112829

(51) Int. Cl.
*B60L 53/30* (2019.01)
*B60L 53/66* (2019.01)
(Continued)

(52) U.S. Cl.
CPC .......... *B60L 53/305* (2019.02); *B60L 53/665* (2019.02); *B60L 53/67* (2019.02); *B60L 53/68* (2019.02)

(58) Field of Classification Search
CPC .................................................. B60L 53/305
(Continued)

(56) References Cited

U.S. PATENT DOCUMENTS

2012/0249068 A1* 10/2012 Ishida ..................... B60L 55/00
320/109
2013/0173331 A1* 7/2013 Mohagheghi ............. H02J 5/00
705/7.25
(Continued)

FOREIGN PATENT DOCUMENTS

JP           201341324 A    2/2013
JP         2014-137751 A    7/2014
(Continued)

*Primary Examiner* — Jerry D Robbins
(74) *Attorney, Agent, or Firm* — HAUPTMAN HAM, LLP

(57) ABSTRACT

Use of a charge-and-discharge spot can be promoted. A charge-and-discharge management system includes a setting controller that sets an incentive linked with a charge-and-discharge spot for each charge-and-discharge spot and a presentation controller that presents the incentive set for each charge-and-discharge spot to a user using an electric vehicle. The charge-and-discharge management system may further include an acquisition controller that connects the electric vehicle to a charge-and-discharge device installed in the charge-and-discharge spot and acquires connection spot information that is information of the charge-and-discharge spot that is a connection destination when charging and discharging is started, and a providing controller that provides an incentive set for the charge-and-discharge spot included in the connection spot information acquired by the acquisition controller when the charging and discharging of the electric vehicle is completed.

5 Claims, 5 Drawing Sheets

(51) Int. Cl.
    *B60L 53/67*       (2019.01)
    *B60L 53/68*       (2019.01)

(58) Field of Classification Search
    USPC .......................................................... 320/109
    See application file for complete search history.

(56) References Cited

U.S. PATENT DOCUMENTS

| | | | |
|---|---|---|---|
| 2018/0281612 A1* | 10/2018 | Perry ...................... | H04W 4/80 |
| 2020/0234575 A1* | 7/2020 | Hishida ................ | G08G 1/0145 |
| 2022/0001763 A1* | 1/2022 | Chadha .................... | B60L 53/66 |
| 2022/0258642 A1* | 8/2022 | Salter ..................... | B60L 53/14 |
| 2024/0211987 A1* | 6/2024 | Nakajima .............. | G06Q 50/14 |

FOREIGN PATENT DOCUMENTS

| | | |
|---|---|---|
| JP | 201532286 A | 2/2015 |
| JP | 2020-115087 A | 7/2020 |

\* cited by examiner

CHARGE-AND-DISCHARGE MANAGEMENT SYSTEM

CROSS REFERENCE OF RELATED APPLICATION

The present application claims priority from Japanese Patent Application No. 2021-112829 filed on Jul. 7, 2021, which is incorporated by reference herein in its entirety.

The present disclosure relates to a charge-and-discharge management system. Specifically, the present disclosure relates to a charge-and-discharge management system that manages charging and discharging for an electric vehicle.

BACKGROUND

For example, in Japanese Laid-open Patent Publication No. 2013-41324, a vehicle invitation device that invites, in a charging station for electric vehicles, an electric vehicle to the charging station is disclosed. In the vehicle invitation device, an electric power demand balance is determined to determine a degree of a request for inviting an electric vehicle to the charging station. As the degree of the request increases, an incentive acquired when the electric vehicle responds to an invitation is increased. Thus, the electric power demand balance can be easily taken.

For example, in Japanese Laid-open Patent Publication No. 2015-32286, an electric power management system that reduces surplus or shortage of electric power in a specific area is disclosed. In the electric power management system, in an area in which surplus or shortage of electric power has occurred, a user is informed of an incentive condition that is achieved when charging and discharging of an electric vehicle is executed. An incentive is provided to a user who has performed charging and discharging in accordance with the incentive condition.

In the vehicle invitation device disclosed in Japanese Laid-open Patent Publication No. 2013-41324 and the electric power management system disclosed in Japanese Laid-open Patent Publication No. 2015-32286, in order to take a total electric power demand balance, an incentive is set to invite an electric vehicle, but neither the vehicle invitation device nor the electric power management system invites an electric vehicle to a specific charge-and-discharge spot, such as a specific charge-and-discharge station. It is presumed that an administrator of a charge-and-discharge spot potentially has a desire that the administrator's charge-and-discharge spot is used by more users.

SUMMARY

A charge-and-discharge management system proposed herein includes a setting controller configured or programmed to set an incentive linked with a charge-and-discharge spot for each charge-and-discharge spot and a presentation controller configured or programmed to present the incentive set for each charge-and-discharge spot to a user using an electric vehicle.

According to the charge-and-discharge management system proposed herein, an incentive linked with the charge-and-discharge spot is set for each charge-and-discharge spot. In charging and discharging the electric vehicle, the user can select a charge-and-discharge spot in consideration of contents of the incentive. Accordingly, in accordance with the contents of the incentive, use of the charge-and-discharge spot can be promoted.

The charge-and-discharge management system proposed herein may further include an acquisition controller and a providing controller. The acquisition controller may be configured or programmed to acquire connection spot information that is information of the charge-and-discharge spot that is a connection destination when charging and discharging is started after connecting the electric vehicle to a charge-and-discharge device installed in the charge-and-discharge spot. The providing controller may be configured or programmed to provide an incentive set for the charge-and-discharge spot included in the connection spot information acquired by the acquisition controller when the charging and discharging of the electric vehicle is completed.

The charge-and-discharge management system proposed herein may further include an incentive acquisition controller configured or programmed to acquire an input incentive input by an administrator of the charge-and-discharge spot. The setting controller may set the input incentive acquired by the incentive acquisition controller as the incentive of the charge-and-discharge spot.

The charge-and-discharge management system proposed herein may further include a cyclic setting controller and a cyclic presentation controller. The cyclic setting controller may be configured or programmed to set, when each of the plurality of charge-and-discharge spots set in advance is a cyclic charge-and-discharge spot, a cyclic incentive that is provided when charging and discharging is performed in the plurality of cyclic charge-and-discharge spots. The cyclic presentation controller may be configured or programmed to present the cyclic charge-and-discharge spot in which a user has not performed charging and discharging on the electric vehicle among the plurality of cyclic charge-and-discharge spots and the cyclic incentive to the user using the electric vehicle.

The charge-and-discharge management system proposed herein may further include a distance setting controller and a distance presentation controller. The distance setting controller may be configured or programmed to set a distance incentive in accordance with a distance from a predetermined place related to the electric vehicle to the charge-and-discharge spot. The distance presentation controller may be configured or programmed to present the distance incentive to the user using the electric vehicle. The distance incentive may be set such that, the longer the distance from the predetermined place to the charge-and-discharge spot is, the higher the distance incentive becomes.

The above and other elements, features, steps, characteristics and advantages of the present invention will become more apparent from the following detailed description of the preferred embodiments with reference to the attached drawings.

DETAILED DESCRIPTION

With reference to the attached drawings, a preferred embodiment of a charge-and-discharge management system disclosed herein will be described below. As a matter of course, the preferred embodiment described herein is not intended to be particularly limiting the present invention. The present invention is not limited to the preferred embodiment described herein, unless specifically stated otherwise. Members/portions that have the same effect will be denoted by the same sign as appropriate and the overlapping description will be omitted as appropriate.

Figure 1:
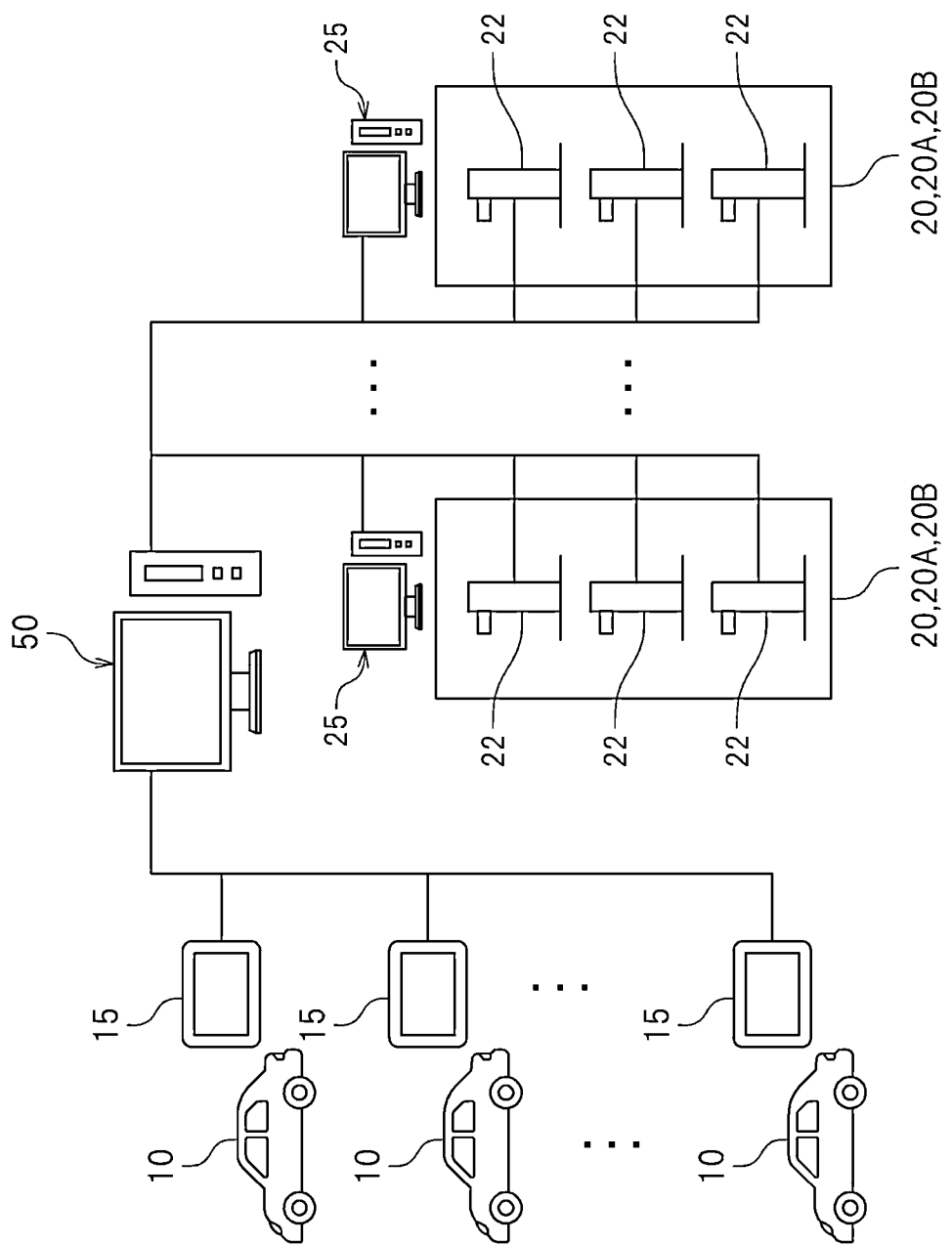
FIG. 1 is a conceptual diagram illustrating a relationship of a charge-and-discharge management system, an electric vehicle, a terminal of a user, a charge-and-discharge device, and a terminal of an administrator according to a preferred embodiment.

FIG. 1 is a conceptual diagram illustrating a connection relationship of a charge-and-discharge management system 50 according to this preferred embodiment. The charge-and-discharge management system 50 according to this preferred embodiment manages charging or discharging for an electric vehicle 10 (referred to as charging and discharging). Although not illustrated, the charge-and-discharge management system 50 includes a power storage device in which electric power is stored. The charge-and-discharge management system 50 manages charging the electric vehicle 10 with the electric power stored in the power storage device and storing electric power discharged from the electric vehicle 10 in the power storage device. The electric power stored in the power storage device is sold to a specific company, such as an electric power company or the like. The charge-and-discharge management system 50 can be used for selling and purchasing electric power.

Herein, those that manage the charge-and-discharge management system 50 are referred to as system administrators. The system administrators are also called aggregator. A system administrator controls a demand amount of electric power to keep a balance between demand and supply of electric power. For example, in response to a request of a specific company, such as an electric power company or the like, the system administrator procures electric power and supplies electric power to the specific company. Therefore, in order to ensure a necessary amount of electric power, the system administrator preferably has contracts with as many users of the electric vehicles 10 as possible and as many administrators that manages charge-and-discharge management devices 22 as possible using the charge-and-discharge management system 50. For example, in the charge-and-discharge management system 50, one or more users who use or own the electric vehicle 10 are registered and one or more administrators who manage the charge-and-discharge management device 22 that performs charging and discharging on the electric vehicle 10 are registered. Note that, in the charge-and-discharge management system 50, the electric vehicle 10 itself and the charge-and-discharge management device 22 itself may be registered. The charge-and-discharge management system 50 manages electric power by supplying electric power to the electric vehicle 10 from the charge-and-discharge management device 22 (herein, charging) and supplying electric power to the charge-and-discharge management device 22 from the electric vehicle 10 (herein, discharging).

In this preferred embodiment, examples of the electric vehicle 10 include vehicles, such as a battery electric vehicle, a hybrid electric vehicle, a plug-in hybrid electric vehicle, or the like, that uses electric power as an energy source. The electric vehicle 10 may be a four-wheel vehicle and may be a two-wheel vehicle. Herein, one or more charge-and-discharge management devices 22 are installed in a charge-and-discharge spot 20. There is no particular limitation on the number of charge-and-discharge management devices 22 installed in one charge-and-discharge spot 20. One charge-and-discharge spot 20 is managed by a predetermined administrator. That is, one or more charge-and-discharge management devices 22 installed in one charge-and-discharge spot 20 are managed by the same administrator. The charge-and-discharge spot 20 can be a parking lot in which the charge-and-discharge management device 22 is installed. Examples of the parking lot include a parking lot of a store that sells commodities, a parking lot of a store, such as a hair salon or the like, that provides services, a parking lot of a commercial facility, a parking of a housing, or the like.

The administrator of the charge-and-discharge spot 20 can be a person who operates a store or a commercial facility that exists in the same place as the charge-and-discharge spot 20. It is presumed that the administrator of the charge-and-discharge spot 20 has installed the charge-and-discharge management device 22 to have users using the charge-and-discharge spot 20 visit the store or the commercial facility. A user of the electric vehicle 10 discharges electric power from the electric vehicle 10 in the charge-and-discharge spot 20, for example, so that the user can earn money in accordance with an amount of discharged electric power. Therefore, it is presumed that the user wants to discharge electric power from the electric vehicle 10 if there is an allowance of electric power of the electric vehicle 10. Accordingly, it is possible to motivate the user of the electric vehicle 10 who wants to discharge electric power to visit the store or the commercial facility by installing the charge-and-discharge management device 22 in the store or the commercial facility.

Incidentally, installation costs are required to install the charge-and-discharge management device 22. The installation costs can be collected by increasing chances for users to visit the store or the commercial facility to increase sales. Therefore, the administrator of the charge-and-discharge spot 20 desires to increase frequency of use of the charge-and-discharge spot 20 to increase frequency of visit to the store or the commercial facility.

Therefore, in this preferred embodiment, an incentive linked with the charge-and-discharge spot 20 is set for each charge-and-discharge spot 20 and provides the incentive to a user who used the charge-and-discharge management device 22 installed in the charge-and-discharge spot 20. Thus, use of the charge-and-discharge spot 20 of a management target that is managed by the administrator can be promoted. Users who want to be provided the incentive can be acquired, and as a result, frequency of use of the charge-and-discharge spot 20 can be increased to increase frequency of visit to the store or the commercial facility.

In this preferred embodiment, the charge-and-discharge management system 50 is realized, for example, by a server of a client-server system. However, the charge-and-discharge management system 50 may be realized by cloud computing. As illustrated in FIG. 1, the charge-and-discharge management system 50 is communicably connected to a terminal 15 of a user using the electric vehicle 10, a terminal 25 of an administrator of the charge-and-discharge spot 20, and the charge-and-discharge management device 22 installed in the charge-and-discharge spot 20.

Figure 2:
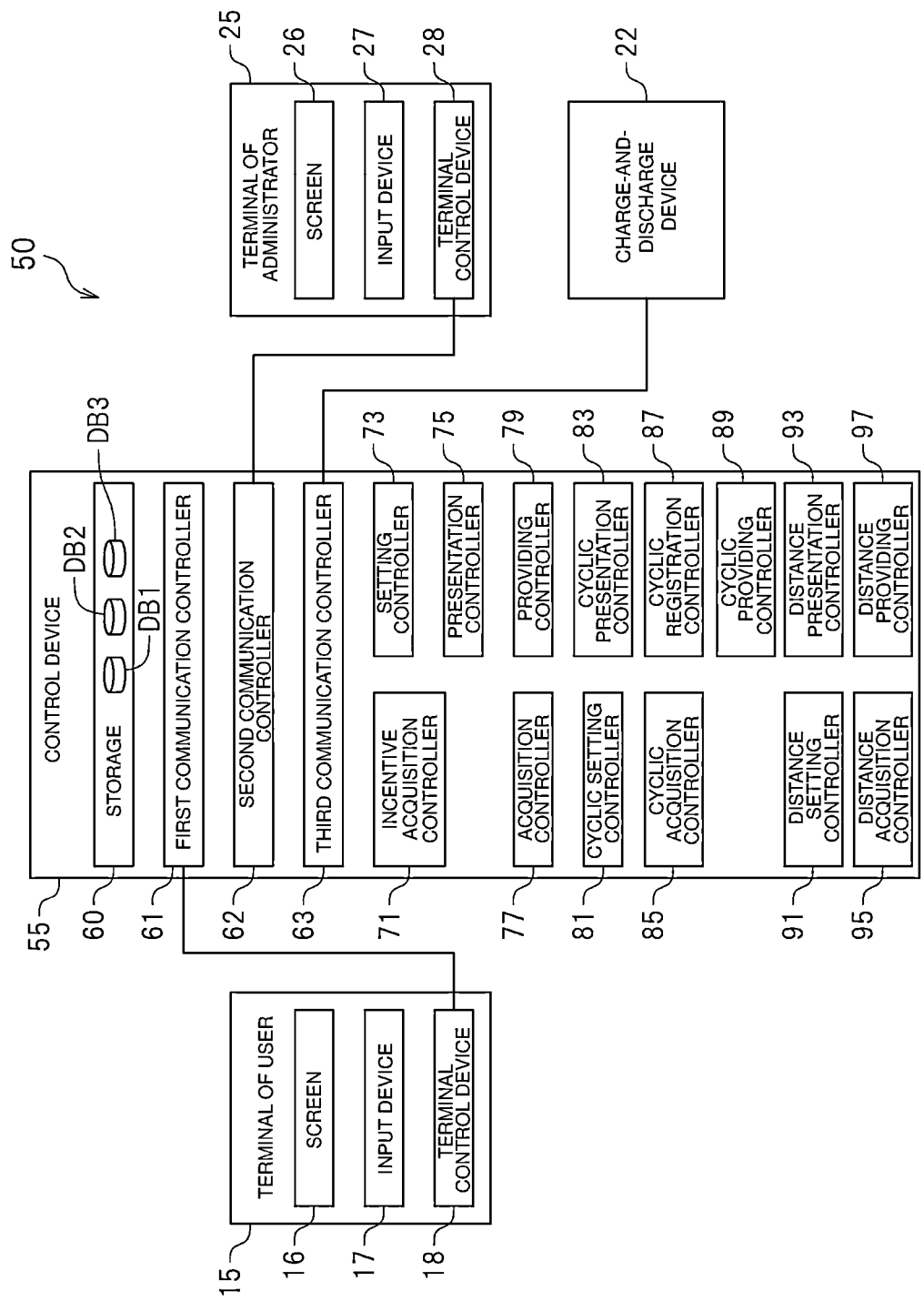
FIG. 2 is a block diagram illustrating the charge-and-discharge management system, the terminal of the user, the charge-and-discharge device, and the terminal of the administrator according to the preferred embodiment.

FIG. 2 is a block diagram illustrating the charge-and-discharge management system 50 or the like. As illustrated in FIG. 2, the charge-and-discharge management system 50 includes a control device 55. There is no particular limitation on a configuration of the control device 55. Herein, the control device 55 is, for example, a microcomputer. The control device 55 includes, for example, an I/F, a CPU, a ROM, and a RAM. The charge-and-discharge management system 50 may be realized by a single computer and may be realized by a plurality of computers in cooperation.

In this preferred embodiment, the control device 55 of the charge-and-discharge management system 50 incudes a storage 60, a first communication controller 61, a second communication controller 62, a third communication controller 63, an incentive acquisition controller 71, a setting controller 73, a presentation controller 75, an acquisition controller 77, and a providing controller 79. The control device 55 further includes a cyclic setting controller 81, a cyclic presentation controller 83, a cyclic acquisition controller 85, a cyclic registration controller 87, a cyclic providing controller 89, a distance setting controller 91, a distance presentation controller 93, a distance acquisition controller 95, and a distance providing controller 97. Each of the controllers 60 to 97 of the control device 55 in the charge-and-discharge management system 50 may be realized by one or more processors and may be incorporated into a circuit.

The first communication controller 61 is configured or programmed to be communicable with the terminal 15 of the user using the electric vehicle 10. Herein, the terminal 15 of the user may be, for example, a car navigation system mounted on the electric vehicle 10 and may be a smartphone, a tablet terminal, or a desktop-type or laptop-type personal computer used by the user. The terminal 15 of the user includes a screen 16, an input device 17, such as a touch panel, a keyboard, a mouse, or the like, that is operated by the user for performing input, and a terminal control device 18. The terminal control device 18 is communicably connected to the screen 16 and the input device 17. Herein, the terminal control device 18 is communicably connected to the first communication controller 61.

The second communication controller 62 is configured or programmed to be communicable with the terminal 25 of the administrator of the charge-and-discharge spot 20. Herein, the terminal 25 of the administrator may be, for example, a smart phone, a tablet terminal, or a desktop type or laptop type personal computer used by the administrator. The terminal 25 of the administrator includes a screen 26, an input device 27, such as a touch panel, a keyboard, a mouse, or the like, that is operated by the administrator for performing input, and a terminal control device 28. The terminal control device 28 is communicably connected to the screen 26 and the input device 27. Herein, the terminal control device 28 is communicably connected to the second communication controller 62.

The third communication controller 63 is configured or programmed to be communicable with the charge-and-discharge management device 22 installed in the charge-and-discharge spot 20.

The setting controller 73 is configured or programmed to set an incentive liked to the charge-and-discharge spot 20 for each charge-and-discharge spot 20. As used herein, the "incentive liked to the charge-and-discharge spot 20" is an incentive linked with information (for example, a specific ID or name) that specifies the charge-and-discharge spot 20. The incentive liked to the charge-and-discharge spot 20 will be hereinafter also referred to as an incentive for each charge-and-discharge spot 20. An incentive is a reward given to the user and is a privilege given to the user. There is no particular limitation on a specific type of the incentive. For example, the incentive may be a point, a coupon, a complementary ticket, acquisition of a commodity, discount of an electricity fee, or the like. Herein, the point may be a point that can be used for payment for charging the electric vehicle 10. For example, the charge-and-discharge spot 20 can be a parking lot of a store, such as a hair salon or the like, where the user receives service or a parking lot of a store where the user purchases a commodity, as described above. The point may be a point that can be used for payment when the user makes a payment to the store of the charge-and-discharge spot 20. The point may be a point that can be exchanged for a commodity, such as a special product or the like. The coupon may be a discount coupon that can be used for charging the electric vehicle 10 and may be a coupon that can be used for adding an extra charge to payment given to the user for discharging electric power from the electric vehicle 10. The coupon may be a coupon that can be used for receiving a discount for fees that the user pays to the store of the charge-and-discharge spot 20. The coupon may be a paper coupon and may be an electronic coupon. The complementary ticket is a ticket that can be used for receiving, for example, in a case where the store of the charge-and-discharge spot 20 provides service, such a privilege that allows the user to make a preferential reservation for service, to skip an order of waiting, or the like.

In this preferred embodiment, the administrator of the charge-and-discharge spot 20 can determine the incentive linked with the charge-and-discharge spot 20 set by the setting controller 73 by himself or herself. However, the incentive for each charge-and-discharge spot 20 may be set by the system administrator of the charge-and-discharge management system 50 and may be automatically set, for example, using an artificial intelligence. A period in which the incentive can be provided may be set for the incentive for each charge-and-discharge spot 20 and the incentive may be an incentive in accordance with the number of times the charge-and-discharge spot 20 has been used.

Next, steps performed to set the incentive of the charge-and-discharge spot 20 by the administrator of the charge-and-discharge spot 20 will be described along a flowchart of FIG. 3. First, in Step S11 of FIG. 3, the incentive acquisition controller 71 of FIG. 2 acquires an input incentive input by the administrator of the charge-and-discharge spot 20. In Step S12, the setting controller 73 of FIG. 3 sets the input incentive acquired by the incentive acquisition controller 71 as the incentive of the charge-and-discharge spot 20 managed by the administrator.

In this preferred embodiment, the incentive of the charge-and-discharge spot 20 set by the setting controller 73 is managed by a sport database DB1 (see FIG. 2). The sport database DB1 is stored in the storage 60 in advance. In the sport database DB1, the charge-and-discharge spot 20 and the incentive set by the setting controller 73 are associated with each other. In Step S12 of FIG. 3, when the setting controller 73 sets the incentive of the charge-and-discharge spot 20, the incentive is registered in the sport database DB1.

Figure 3:
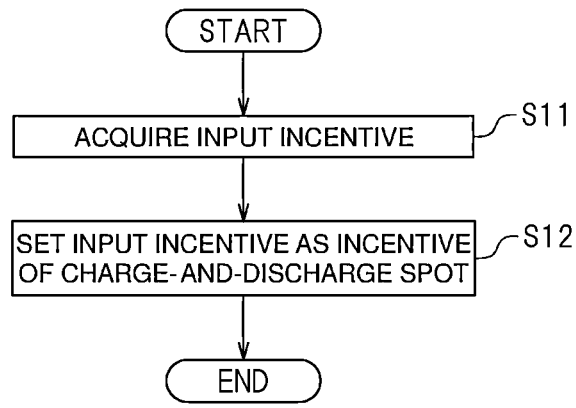
FIG. 3 is a flowchart illustrating steps performed to set an incentive for each charge-and-discharge spot.

Note that, in Step S11 of FIG. 3, there is no particular limitation on a device via which the administrator inputs the input incentive acquired by the incentive acquisition controller 71. As illustrated in FIG. 2, for example, in the terminal 25 of the administrator, the screen 26 and the input device 27, such as a touch panel, a keyboard, a mouse, or the like, are provided. On the screen 26, for example, an input incentive input screen (not illustrated) is displayed. The administrator operates the input device 27 to input an input incentive that the administrator desires to set to the input incentive input screen. When the input incentive is determined, the input incentive is transmitted to the control device 55 of the charge-and-discharge management system 50 from the terminal control device 28 of the terminal 25 of the administrator via the second communication controller 62. Then, the incentive acquisition controller 71 acquires the input incentive transmitted to the control device 55.

In this preferred embodiment, the user of the electric vehicle 10 can determine a charging and discharging destination in consideration of the incentive for each charge-and-discharge spot 20 when charging and discharging is performed to the electric vehicle 10. Herein, the presentation controller 75 of the charge-and-discharge management system 50 illustrated in FIG. 2 presents the incentive set for each charge-and-discharge spot 20 to the user using the electric vehicle 10. Note that there is no particular limitation on a specific device that presents the incentive set for each charge-and-discharge spot 20 to the user. An incentive table (not illustrated) in which the charge-and-discharge spot 20 and the incentive of the charge-and-discharge spot 20 are associated with one another may be displayed, for example, on the screen 16 (see FIG. 2) of the terminal 15 of the user. In this case, a distance from a current position of the user to the charge-and-discharge spot 20 or the like may be included in the incentive table. The incentive table may have a rearrangement function. For example, the incentive table has a function of rearranging in accordance with the distance to the charge-and-discharge spot 20 or a type of the incentive. Moreover, when the user determines the charge-and-discharge spot 20 that is a charging and discharging destination, the presentation controller 75 may be configured or programmed to indicate a route to the determined charge-and-discharge spot 20 that is a charging and discharging destination and have a function of guiding the route to the charge-and-discharge spot 20.

Next, steps performed to provide the incentive to the user will be described along a flowchart illustrated in FIG. 4. Herein, for example, when charging or discharging is performed on the electric vehicle 10 of the user, the incentive set for the charge-and-discharge spot 20 in which the charge-and-discharge management device 22 that performed charging and discharging on the electric vehicle 10 is installed to the user. Herein, the user first goes to the charge-and-discharge spot 20 using the electric vehicle 10. Then, the user connects the electric vehicle 10 to the charge-and-discharge management device 22 installed in the charge-and-discharge spot 20 to start charging and discharging. At this time, in Step S21 of FIG. 4, the acquisition controller 77 of FIG. 2 acquires information related to the charge-and-discharge spot 20 that is a connection destination (which will be hereinafter referred to as connection spot information) when the electric vehicle 10 is connected to the charge-and-discharge management device 22 installed in the charge-and-discharge spot 20. The connection spot information includes at least information, such as, for example, a specific ID given to the charge-and-discharge spot 20, the name of the charge-and-discharge spot 20, or the like, that specifies the charge-and-discharge spot 20. Herein, when charging and discharging is started, the connection spot information is transmitted to the control device 55 of the charge-and-discharge management system 50 from the charge-and-discharge management device 22 via the third communication controller 63. The acquisition controller 77 acquires the connection spot information transmitted to the control device 55.

Figure 4:
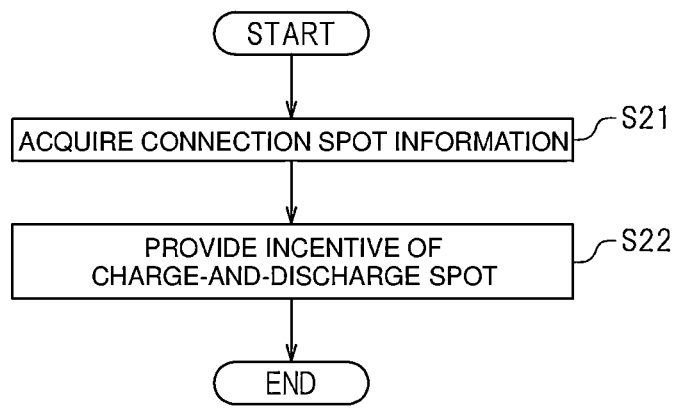
FIG. 4 is a flowchart illustrating steps performed to provide the incentive for each charge-and-discharge spot.

In this preferred embodiment, when charging and discharging of the electric vehicle 10 is completed, the incentive of the charge-and-discharge spot 20 is provided to the user in Step S22 of FIG. 4. Herein, the providing controller 79 of FIG. 2 provides the incentive set for the charge-and-discharge spot 20 included in the connection spot information acquired by the acquisition controller 77 when charging and discharging of the electric vehicle 10 is completed. Herein, when charging and discharging of the electric vehicle 10 is completed may be, for example, when the electric vehicle 10 is removed from the charge-and-discharge management device 22, may be when connection of the electric vehicle 10 and the charge-and-discharge management device 22 to each other is released, and may be a timing at which charging and discharging is completed and then payment for a fee or receiving payment is completed.

Herein, "providing the incentive" by the providing controller 79 or the like refers to registering the incentive for the user with the user and the incentive associated with each other, for example, in the sport database DB1 stored in the storage 60. However, for example, in a case where the incentive is a coupon that can be electronically exchanged, that is, for example, an electronic coupon, it may be assumed that transmitting the electronic coupon to the terminal 15 of the user is providing the incentive.

In this preferred embodiment, as illustrated in FIG. 2, the charge-and-discharge management system 50 includes the setting controller 73 configured or programmed to set the incentive linked with the charge-and-discharge spot 20 for each charge-and-discharge spot 20 and the presentation controller 75 configured or programmed to present the incentive set for each charge-and-discharge spot 20 to the user using the electric vehicle 10. Thus, the user can select the charge-and-discharge spot 20 in consideration of contents of the incentive in charging and discharging the electric vehicle 10 by setting the incentive for each charge-and-discharge spot 20. Accordingly, use of the charge-and-discharge spot 20 can be promoted in accordance with the contents of the incentive.

In this preferred embodiment, the charge-and-discharge management system 50 includes the acquisition controller 77 and the providing controller 79. The acquisition controller 77 is configured or programmed to acquire the connection spot information that is information of the charge-and-discharge spot 20 that is a connection destination when charging and discharging is started after connecting the electric vehicle 10 to the charge-and-discharge management device 22 installed in the charge-and-discharge spot 20. The providing controller 79 is configured or programmed to provide the incentive set for the charge-and-discharge spot 20 included in the connection spot information acquired by the acquisition controller 77 when charging and discharging of the electric vehicle 10 is completed. Thus, the incentive can be provided to the user at a timing at which charging and discharging by the charge-and-discharge management device 22 is completed.

In this preferred embodiment, the charge-and-discharge management system 50 includes the incentive acquisition controller 71 configured or programmed to acquire the input incentive input by the administrator of the charge-and-discharge spot 20. The setting controller 73 sets the input incentive acquired by the incentive acquisition controller 71 as the incentive of the charge-and-discharge spot 20. Thus, the incentive in accordance with a desire of the administrator of the charge-and-discharge spot 20 can be set for the charge-and-discharge spot 20 of the management target. For example, use of the charge-and-discharge spot 20 of the management target can be promoted, for example, by setting an incentive attractive to the user by the administrator by himself or herself.

Note that, in this preferred embodiment, some other incentive than the incentive for each charge-and-discharge spot 20 can be set. For example, the charge-and-discharge management system 50 can set a cyclic incentive. The cyclic incentive is an incentive that is provided when charging and discharging is performed in a plurality of charge-and-discharge spots 20 that have been set in advance (which will be hereinafter referred to as cyclic charge-and-discharge spots 20A (see FIG. 1)). The cyclic incentive incorporates elements of so-called stamp rally and is an incentive that is provided when electric power is charged to or discharged from the electric vehicle 10 in the plurality of cyclic charge-and-discharge spot 20A. Note that, in an example of FIG. 1, all of the charge-and-discharge spots 20 are also the cyclic charge-and-discharge spots 20A, but only some of the charge-and-discharge spots 20 may be cyclic charge-and-discharge spots 20A.

Herein, the cyclic setting controller 81 of the charge-and-discharge management system 50 illustrated in FIG. 2 is configured or programmed to set the cyclic incentive that is provided when the electric vehicle 10 is charged and discharged in the plurality of cyclic charge-and-discharge spots 20A. Herein, the plurality of cyclic charge-and-discharge spots 20A may be set by the system administrator of the charge-and-discharge management system 50, for example, in accordance with frequency of use of each charge-and-discharge spot 20. The cyclic incentive may be set by the system administrator and may be automatically set by an artificial intelligence or the like.

For example, the charge-and-discharge spots 20 set as the plurality of cyclic charge-and-discharge spots 20A may be spots managed by the same administrator. In this case, similar to the incentive for each charge-and-discharge spot 20, the cyclic incentive may be set by the administrator by himself or herself using the terminal 25 of the administrator.

In this preferred embodiment, the cyclic incentive set by the cyclic setting controller 81 is managed by a cyclic database DB2 (see FIG. 2). The cyclic database DB2 is stored in the storage 60 in advance. When the cyclic setting controller 81 sets the cyclic incentive, the cyclic incentive is registered in the cyclic database DB2.

The cyclic presentation controller 83 of the charge-and-discharge management system 50 illustrated in FIG. 2 is configured or programmed to present the cyclic charge-and-discharge spot 20A where the user has never charged and discharged the electric vehicle 10 (which will be hereinafter referred to as a non-cyclic charge-and-discharge spot) among the plurality of cyclic charge-and-discharge spots 20A and the cyclic incentive to the user using the electric vehicle 10. There is no particular limitation on a specific device that presents the non-cyclic charge-and-discharge spot and the cyclic incentive to the user. Similar to the incentive for each charge-and-discharge spot 20, a list table of the non-cyclic charge-and-discharge spots and the cyclic incentive may be displayed on the screen 16 (see FIG. 2) of the terminal 15 of the user.

Figure 5:
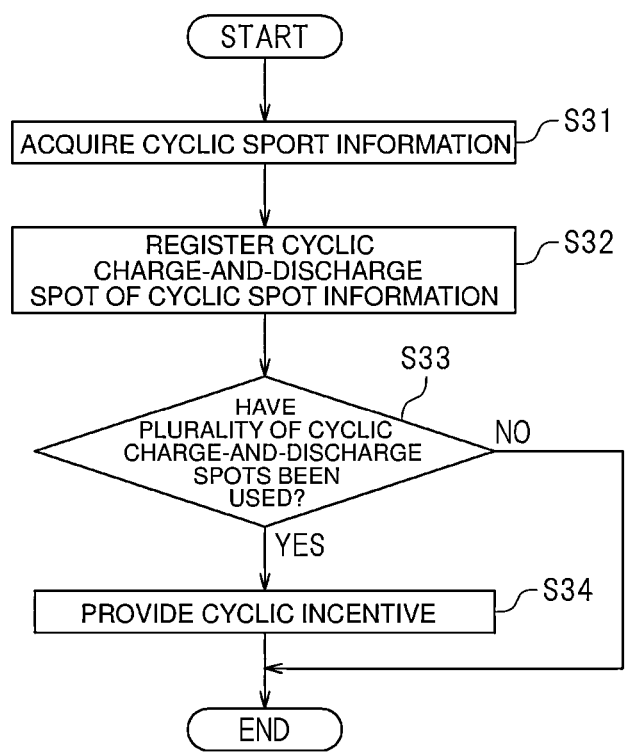
FIG. 5 is a flowchart illustrating steps performed to provide a cyclic incentive.

Next, steps performed to provide the cyclic incentive will be described along a flowchart illustrated in FIG. 5. First, in Step S31, the cyclic acquisition controller 85 of FIG. 2 acquires cyclic spot information that is information related to the cyclic charge-and-discharge spot 20A when charging and discharging is started after connecting the electric vehicle 10 to the charge-and-discharge management device 22 installed in the cyclic charge-and-discharge spot 20A.

Next, in Step S32, the cyclic registration controller 87 registers the cyclic charge-and-discharge spot 20A included in the cyclic spot information acquired by the cyclic acquisition controller 85 in the cyclic database DB2 when charging and discharging of the electric vehicle 10 is completed.

Next, in Step S33, whether the user has used the plurality of cyclic charge-and-discharge spots 20A for charging and discharging is determined. Herein, if there is the cyclic charge-and-discharge spot 20A that has not been used by the user, determination in Step S33 is NO. In this case, the cyclic incentive is not provided.

On the other hand, if there is no cyclic charge-and-discharge spot 20A that has not been used by the user, determination in Step S33 is YES and the process proceeds to Step S34 next. In Step S34, in the cyclic database DB2 stored in the storage 60, when the user uses the plurality of cyclic charge-and-discharge spots 20A, the cyclic providing controller 89 provides the cyclic incentive to the user. Herein, for example, in the cyclic database DB2, it is registered that the cyclic incentive has been provided, and thus, the incentive is provided to the user.

As described above, in this preferred embodiment, the cyclic incentive can be provided by charging and discharging the electric vehicle 10 in the plurality of cyclic charge-and-discharge spots 20A. Accordingly, if there are the plurality of charge-and-discharge spots 20 use of which is desired to be promoted, the plurality of charge-and-discharge spots 20 use of which is desired to be promoted are set as the cyclic charge-and-discharge spots 20A and the cyclic incentive is provided for the cyclic charge-and-discharge spots 20A. Thus, use of the plurality of cyclic charge-and-discharge spots 20A can be promoted.

For example, when charging and discharging is performed on the electric vehicle 10, the charge-and-discharge spot 20 located at a distance as close as possible is desired to be used. Therefore, the charge-and-discharge spot 20 located at a long distance is less likely to be used. Therefore, in order to promote use of the charge-and-discharge spot 20 located at a long distance, the charge-and-discharge management system 50 can set a distance incentive. Herein, the charge-and-discharge spot 20 for which the distance incentive is set is referred to as a distance charge-and-discharge spot 20B (see FIG. 1). Note that, in the example of FIG. 1, all of the charge-and-discharge spots 20 are also the distance charge-and-discharge spots 20B, but only some of the plurality of charge-and-discharge spots 20 may be the distance charge-and-discharge spots 20B.

The distance incentive is an incentive set in accordance with a distance from a predetermined place related to the electric vehicle 10 to the distance charge-and-discharge spot 20B. Herein, the predetermined place related to the electric vehicle 10 may be, for example, a place registered in a garage certification of the electric vehicle 10 and may be a domicile or residence of the user. The predetermined place related to the electric vehicle 10 may be also a current place where the electric vehicle 10 is located.

In this preferred embodiment, the distance setting controller 91 of the charge-and-discharge management system 50 illustrated in FIG. 2 is configured or programmed to set the distance incentive in accordance with the distance from the predetermined place related to the electric vehicle 10 to the distance charge-and-discharge spot 20B. The distance incentive may be set by the system administrator of the charge-and-discharge management system 50 and may be automatically set by an artificial intelligence or the like. Similar to the incentive for each charge-and-discharge spot 20, the distance incentive may be set by the administrator by himself or herself using the terminal 25 of the administrator of the distance charge-and-discharge spot 20B.

In this preferred embodiment, the distance incentive is set such that, the longer the distance from the predetermined place related to the electric vehicle 10 to the distance charge-and-discharge spot 20B is, the higher the distance incentive becomes. In other words, the distance incentive is set such that, the shorter the distance from the predetermined place to the distance charge-and-discharge spot 20B is, the lower the distance incentive becomes. Herein, when the distance incentive is high, a beneficial feeling given by the incentive is increased. For example, in a case where the distance incentive is a point, it is considered that, when more points are provided, the distance incentive is higher.

In this preferred embodiment, the distance incentive set by the distance setting controller 91 is managed by a distance database DB3 (see FIG. 2). The distance database DB3 is stored in the storage 60 in advance. When the distance setting controller 91 sets the distance incentive, the distance incentive is registered in association with the distance charge-and-discharge spot 20B in the distance database DB3.

The distance presentation controller 93 of the charge-and-discharge management system 50 illustrated in FIG. 2 is configured or programmed to present the distance incentive set for each distance charge-and-discharge spot 20B to the user using the electric vehicle 10. There is no particular limitation on a specific device that presents the distance incentive to the user. Similar to the incentive for each charge-and-discharge spot 20, a table (not illustrated) in which the distance charge-and-discharge spot 20B and the distance incentive are associated with each other may be displayed on the screen 16 of the terminal 15 of the user.

Figure 6:
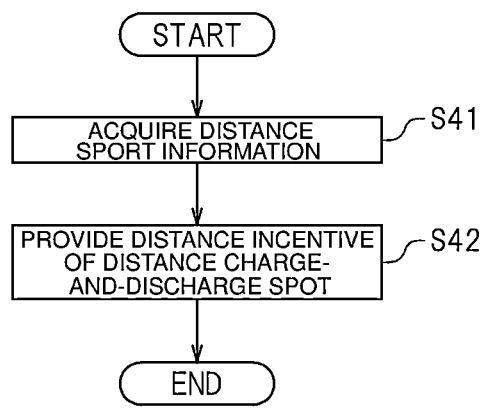
FIG. 6 is a flowchart illustrating steps performed to provide a distance incentive.

For example, when the electric vehicle 10 of the user is charged and discharged in the distance charge-and-discharge spot 20B, the distance incentive set for the distance charge-and-discharge spot 20B is provided to the user. Next, steps performed to provide the distance incentive will be described along a flowchart illustrated in FIG. 6. First, in Step S41, the distance acquisition controller 95 of FIG. 2 is configured or programmed to acquire distance sport information that is information related to the distance charge-and-discharge spot 20B when the electric vehicle 10 is connected to the charge-and-discharge management device 22 installed in the distance charge-and-discharge spot 20B.

When charging and discharging is completed in the distance charge-and-discharge spot 20B, the distance incentive is provided to the user. In Step S42, in the distance charge-and-discharge spot 20B, the distance providing controller 97 of FIG. 2 is configured or programmed to provide the distance incentive set for the distance charge-and-discharge spot 20B included in the distance sport information acquired by the distance acquisition controller 95 when charging and discharging of the electric vehicle 10 is completed. Herein, providing the distance incentive means registering the distance incentive for the user, for example, in the distance database DB3 stored in the storage 60.

As described above, in this preferred embodiment, the distance incentive is set in accordance with the distance from the predetermined place related to the electric vehicle 10. Herein, the distance incentive is set such that, the longer the distance from the predetermined place related to the electric vehicle 10 is, the higher the distance incentive becomes. Thus, use can be promoted for the distance charge-and-discharge spot 20B located in a place distant from the predetermined place of the electric vehicle 10 (for example, the domicile or residence of the user).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A charge-and-discharge management system comprising:
   a setting controller configured or programmed to set an incentive linked with a charge-and-discharge spot for each charge-and-discharge spot;
   a presentation controller configured or programmed to present the incentive set for each charge-and-discharge spot to a user using an electric vehicle;
   a cyclic setting controller configured or programmed to set, when each of the plurality of charge-and-discharge spots set in advance is a cyclic charge-and-discharge spot, a cyclic incentive that is provided when charging and discharging is performed in the plurality of cyclic charge-and-discharge spots; and
   a cyclic presentation controller configured or programmed to present the cyclic charge-and-discharge spot in which a user has not performed charging and discharging on the electric vehicle among the plurality of cyclic charge-and-discharge spots and the cyclic incentive to the user using the electric vehicle.

2. The charge-and-discharge management system according to claim 1, further comprising:
   an acquisition controller configured or programmed to acquire connection spot information that is information of the charge-and-discharge spot that is a connection destination when charging and discharging is started after connecting the electric vehicle to a charge-and-discharge device installed in the charge-and-discharge spot; and
   a providing controller configured or programmed to provide an incentive set for the charge-and-discharge spot included in the connection spot information acquired by the acquisition controller when the charging and discharging of the electric vehicle is completed.

3. The charge-and-discharge management system according to claim 1, further comprising:
   an incentive acquisition controller configured or programmed to acquire an input incentive input by an administrator of the charge-and-discharge spot,
   wherein the setting controller sets the input incentive acquired by the incentive acquisition controller as the incentive of the charge-and-discharge spot.

4. The charge-and-discharge management system according to claim 1, further comprising:
   a distance setting controller configured or programmed to set a distance incentive in accordance with a distance from a predetermined place related to the electric vehicle to the charge-and-discharge spot; and
   a distance presentation controller configured or programmed to present the distance incentive to the user using the electric vehicle.

5. The charge-and-discharge management system according to claim 4,
   wherein the distance incentive is set such that, the longer the distance from the predetermined place to the charge-and-discharge spot is, the higher the distance incentive becomes.

* * * * *